United States Patent
Shinohara et al.

(10) Patent No.: US 7,332,557 B2
(45) Date of Patent: Feb. 19, 2008

(54) EPOXY RESIN, EPOXY RESIN COMPOSITION THEREOF AND CURED PRODUCT THEREOF

(75) Inventors: Shuya Shinohara, Tokyo (JP); Masayoshi Hanabusa, Tokyo (JP); Nobuhisa Saito, Tokyo (JP); Hiroshi Nakanishi, Tokyo (JP)

(73) Assignee: Tohto Kasei Co., Ltd. (JP)

( * ) Notice: Subject to any disclaimer, the term of this patent is extended or adjusted under 35 U.S.C. 154(b) by 160 days.

(21) Appl. No.: 10/755,447

(22) Filed: Jan. 13, 2004

(65) Prior Publication Data

US 2004/0176563 A1 Sep. 9, 2004

(51) Int. Cl.
*B32B 27/38* (2006.01)
*C07D 303/27* (2006.01)
*C08G 59/06* (2006.01)

(52) U.S. Cl. .................. 528/87; 428/413; 525/523; 549/517

(58) Field of Classification Search ............ None
See application file for complete search history.

(56) References Cited

U.S. PATENT DOCUMENTS

| | | | | |
|---|---|---|---|---|
| 4,153,621 A | * | 5/1979 | Hartmann | 549/560 |
| 7,063,914 B2 | * | 6/2006 | Kawano et al. | 429/44 |
| 2003/0175571 A1 | * | 9/2003 | Kawano et al. | 429/34 |

FOREIGN PATENT DOCUMENTS

| | | | | |
|---|---|---|---|---|
| JP | 03166220 A | * | 7/1991 | |
| JP | 04236215 A | * | 8/1992 | |
| JP | 05001210 A | * | 1/1993 | |
| JP | 05070562 A | * | 3/1993 | |
| JP | 05262853 A | * | 10/1993 | |
| JP | 06239968 A | * | 8/1994 | |
| JP | 07053669 A | * | 2/1995 | |

OTHER PUBLICATIONS

CAPLUS registry No. 151204-83-0 for the diglycidyl ether of 4,4'-[(1,4-phenylene)bis(isopropylidene)] bisphenol, 1993.*
CAPLUS registry No. 158663-92-4 for the diglycidyl ether of 4,4'-[(1,4-phenylene)bis(isopropylidene)] bis(2-methylphenol, 1993.*

* cited by examiner

*Primary Examiner*—Robert Sellers
(74) *Attorney, Agent, or Firm*—H. Jay Spiegel; Robert L. Haines (57) ABSTRACT

An epoxy resin represented by general formula (2),

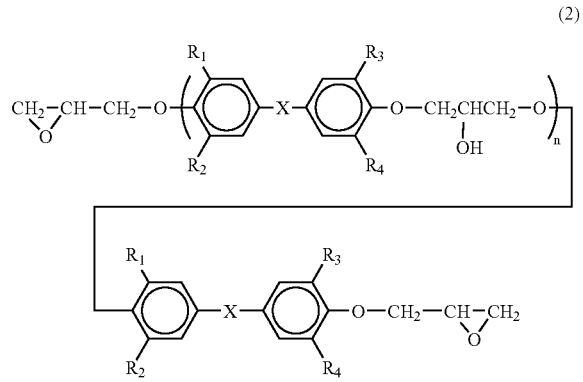

wherein $R_1$-$R_4$ indicate a hydrocarbon group of carbon number 1-6, n is 0 or integer of 1 or more and X is a bond or the following general formula

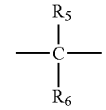

wherein $R_5$-$R_6$ indicate a hydrogen atom or hydrocarbon group of carbon number 1-6, obtained by reacting an aromatic compound represented by general formula (1) and epihalohydrine,

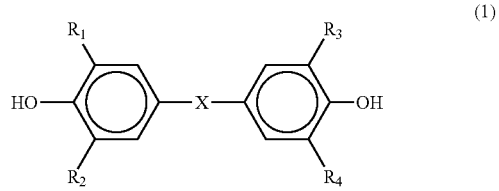

wherein $R_1$-$R_4$ and X are as identified herein, having molecular weight distribution comprising, content of n=0 component in the epoxy resin represented by general formula (2) is 60% or less and epoxy equivalent is 250 g/eq or over.

4 Claims, 6 Drawing Sheets

Fig. 1 elution timr (min)

wave length

Fig.6 elution time (min)

wave length

EPOXY RESIN, EPOXY RESIN COMPOSITION THEREOF AND CURED PRODUCT THEREOF

FIELD OF THE INVENTION

The present invention relates to the epoxy resin which is excellent at solvent dissolution stability in the viscous liquid state, semi solid state or solid state, characterized not to generate crystallinity at the normal temperature, the epoxy resin composition containing said epoxy resin and the cured product obtained by curing said epoxy resin composition.

DESCRIPTION OF THE PRIOR ART

In the case of semi-conductor sealing material, which belongs to the electric/electronic field, improvement to high tenacity and low water absorption by high filling of silica for the purpose to protect from the problem of packaging crack was required, and various low viscous crystalline epoxy resin have been proposed (Japanese Patent Laid Open Publications 7-126574 and 2-12225 and Japanese Patent Application 9-310494).

In the meanwhile, in the coating field, following powder coating which does not contain solvent is required from the view point of the air pollution or the working environment. Namely, a powder coating which is gentle to the environment and is excellent in anti corrosive feature is strongly required. Further, when a baking coating is took example, this kind of coating is coated as a PCM coating which coats the surface of metal or as a coating to coat the outer and inner surface of a can of canned food, canned beverage or canned splay. In the case of the usage as the coating for the purpose to coat the outer and inner surface of a can, the high temperature heating (retort treatment) is carried out to sterilize the contents when need is arisen. Therefore, in the case of beverage of low sugar or no sugar, such as tea, the uses of which are increasing in recent years, the following problem is strongly pointed out. That is, the problem that the very minor components which are eluted from the coating spoils the taste and flavor (preservation of flavor) of the contents is strongly pointed out, therefore the high functional coating film which protect substantially the elution of very minor components was required (Japanese Patent Application 9-119992). In the field of the coating, up-to the present, the quality of liquid and solid bis-phenol A epoxy resins obtained by the reaction of bis-phenol and epihalohydrine, further, the quality of phenoxy resin of high molecular weight are improved, therefore, are most broadly used from the industrial view point.

On the other hand, in the field of semi-conductor sealing material, especially, crystallinity epoxy resin is required, and for the purpose to accomplish the improvement of mechanical intensity by high density filling of silica, the high crystallinity epoxy resin which does not spoil the preservative stability even if it becomes low viscous is required. Also in the field of powder coating, from the similar technical concept, the crystalline epoxy resin is required for the purpose to prevent the problem of blocking and to improve the fluidity and smoothness. From above mentioned technical back ground, various kinds of crystalline epoxy resins are proposed and several methods for preparation of said resins are proposed (Japanese Patent Laid Open Publications 7-179564 and 7-109328).

OBJECT OF THE INVENTION

However, although the heat resistance and water resistance of the cured coated film of above mentioned various crystalline epoxy resins are improved because the crosslinking density is enhanced based on lower epoxy equivalent, said epoxy resins have a serious defect that causes crack or peeling of the coated film based on the too rigid feature and lack of flexibility and adhesion of film. In the meanwhile, in the case of anticorrosive coating or baking coating, since diluting agents, solvents or various kinds of additives are used together with, crystalline epoxy resin, which is a main component, is crystallized and deposited and causes the problem that it is very difficult to maintain the stabilized coating form. Such phenomenon is also a serious problem besides in the use of a coating, such as adhesive, engineering works, hybrid materials or laminated board, and is an obstacle for the broad application of the crystalline epoxy resins. Therefore, the use of these crystalline epoxy resins is specified to the field of a sealing material or a powder coating. Further, in the case of semi-conductor sealing material, although the crystalline epoxy resins is very advantageous for the purpose to enhance the filling ratio of silica, when the fling ratio is low, the reinforcing effect of filler is deteriorated and cause the problem to loose the rigidity and resistance to heat tracking. Concerning above mentioned circumstance, the development of a novel well balanced crystalline epoxy resin which maintains good heat resistance, surpasses in water resistance and adherent and the crystallinity is controlled have been awaited,

BRIEF SUMMARY OF THE INVENTION

Based on the current situation and concerning above mentioned problem, the inventors of the present invention have continued the intensive study to obtain an epoxy resin providing the cured product superior in mechanical feature, heat resistance, water resistance and adhesion which does not have crystallinity and bisphenol A epoxy resin skeletal structure. Consequently, the inventors of the present invention have found that by providing broad molecule weight distribution to the epoxy resin composed by specific molecular structure, the excellent heat resistance, water resistance and adhesion can be obtained when the epoxy resin is cured, and accomplished the present invention.

That is the scope of the present invention is the epoxy resin represented by general formula (2), (2)

wherein, $R_1$-$R_4$ indicate a hydrocarbon group of carbon number 1-6, n is 0 or integer of 1 or more and X is a bond or the following general formula wherein $R_5$-$R_6$ indicate a hydrogen atom or hydrocarbon group of carbon number 1-6, obtained by reacting an aromatic compound represented by general formula (1) and epihalohydrine, (1)

wherein $R_1$-$R_4$ and X are as identified herein, having molecular weight distribution comprising, content of n=0 component in the epoxy resin represented by general formula (2) is 60% or less and epoxy equivalent is 250 g/eq or over, further the present invention is the cured product obtained by curing said epoxy resin, and is the coated product on which said epoxy resin composition is coated and cured.

DETAILED DESCRIPTION OF THE INVENTION

The detail of the present invention will be illustrated as follows.

As the example of the aromatic compound represented by general formula (1), 3,3',5,5'-tetramethyl-4,4'-dihydroxydiphenylmethane, and 4,4'-bishydroxy-3,3',5,5'-tetramethylbiphenyl can be mentioned, therefore, diglycidylether compound having epoxy resin structure represented by general formula (2) can be mentioned. Especially, diglycidylether compound of 3,3',5,5'-tetramethyl-4,4'-dihydroxydiphenylmethane is desirable. As the typical method for preparation of this compound, the method to react 3,3',5,5'-tetramethyl-4,4'-dihydroxydiphenylmethane (hereinafter shortened to tetramethylbisphenol F), which is the phenol compound obtained by condensation reaction of 2,6xylenol and formaldehyde, with epihalohydrin can be mentioned. This reaction can be carried out same as to the conventional epoxidation reaction, namely, by a direct method for synthesis characterized by dissolving tetramethylbisphenol F in epihalohydrin and after that reacting these two compounds under the presence of alkali metal hydroxide catalyst such as sodium hydroxide or by an indirect method for synthesis characterized by reacting tetramethylbisphenol F with epoxy resin obtained by this method. In both methods, the reaction solvent can be used if necessary.

In general, in the method for preparation to obtain crystalline epoxy resin, at the synthesis, it is necessary to improve the purity of monomer epoxy resin, to select the reacting condition by which high molecular weight epoxy resin larger than dimer is not generated and to make the purity of monomer epoxy resin higher at least than 80%. Further, the action to make the purity of monomer epoxy resin higher is carried out by recrystalization if necessary. In the present invention, the object of the invention is not to make the crystallinity as the necessary and enough condition, but to use the epoxy resin having high symmetrical structure and to enlarge the applicability for use in the resin state which does not generate the crystallinity. The present invention is to obtain the epoxy resin whose degree of polymerization n is large in wide sphere by controlling the purity of epoxy monomer smaller than 60%. Therefore, the epoxy resin of the present invention can be prepared by the conventional and public known method, and since not necessary to use super excess epihalohydrin, the preparation can be carried out very advantageously from the economical view point.

Further, by the other words, the present invention is to obtain the epoxy resin having a certain molecular weight distribution containing components of various degree of polymerization n. More specifically, the epoxy resin of the present invention is the polymer epoxy resin of higher epoxy equivalent than 250 g/eq, of higher average molecular weight than 500, in the case of baking coating of higher average molecular weight than 10,000, further the present invention is the polyhydroxy polyether resin having a self film forming ability and having a structural unit of the present invention. In the epoxy resin of the present invention, the semisolid epoxy resin of epoxy equivalent 250 g/eq contains the epoxy resin whose content of n=0 component is 50%, forms homogeneous vanish state when dissolved in aromatic hydro carbon (for example toluene) and n=0 component is separated from the solvent and can maintain the form of coating stable without crystallization. Further, in the case of middle molecular weight epoxy resin of epoxy equivalent 800 g/eq, which is applied as the powder coating, n=0 component is 7.5% and the cured coated film thereof can be the coated film with good heat resistance, boiled water resistance, flexibility and adhesion. Furthermore, the cured coated film which applies the epoxy resin of high molecular weight of epoxy equivalent 2100 g/eq and polyhydroxypolyether resin of epoxy equivalent 35000 g/eq can provide the coated film with good heat resistance and retort blushing resistance. Still further, polyhydroxypolyether resin of epoxy equivalent 35000 g/eq can accomplish the self film forming ability by resin alone. When the epoxy resin based on the present invention is compared with the ordinary used bisphenol A epoxy resins, heat resistance and water resistance are remarkably improved. And when the middle molecular weight epoxy resin whose epoxy equivalent is from 800 to 2000 g/eq of the present invention which is used for powder coating with the crystalline epoxy resin (epoxy equivalent is 189 g/eq) of low epoxy equivalent, flexibility and adhesion are remarkably improved, and is an important effect of the present invention. Consequently, the industrial applicability of the present invention is remarkably expanded, and is fully satisfying the practical efficiency. In the present invention, the application to a coating is shown as the example, however, the epoxy resin of the present invention can be applied to any uses which can use the efficiency of said epoxy resin.

The epoxy resin composition of the present invention is the epoxy resin composition which contains the epoxy resin represented by general formula (2). As the component besides the epoxy resin of general formula (2), a conventional epoxy resin which possesses 2 or more epoxy functional groups in one molecule can be used together with in the limit not to deteriorate the special feature of the present invention. For example, an epoxy resin inducted from divalent phenol such as bisphenol F, bisphenol S, tetrabromobisphenol A, fluorene bisphenol, 4,4'biphenol, 2,2' biphenol, hydroquinone, 2,5-tertiarbutylhydroquinone, resorcin or naphthalene diol or trivalent or more phenol such as phenol novolac, orthocresol novolac, naphtol novolac, tris-(4-hydroxyphenyl)methane or 1,1,2,2-tetrakis(4-hydroxyphenyl) ethane can be mentioned. One or two kinds of these epoxy resins can be voluntarily blended.

The epoxy resin composition of the present invention can be cured by adding a curing agents. As the curing agent which can be added, any kinds of the curing agent which are generally known as the curing agent used for the epoxy resin can be used. For example, aliphatic amines, alicyclic polyamines, aromatic amines and denatured product thereof, dicyane diamides, polyhydric phenols and acid anhydrides can be mentioned. Specifically, diethylenetriamine, triethylenetetramine, metaxylenediamine, isophoronediamine, norbornanediamine, amine compounds such as polyamideamine, which is the polycondensed product of acid such as dimer acid and polyamine, phenol compounds such as aralkyl phenol resins obtained by condensation reaction of 4,4'-diaminodiphenylmethane, 4,4'-diaminodiphenylsulfone, acid anhydride compounds such as phthalic anhydride, trimellitic anhydride, pyromellitic anhydride, maletic anhydride, hexahydrophthalic anhydride, phenols such as phenol, cresol, naphthol, naphthalene diol with aldehydes such as formaldehyde or ketone, dicyandiamide and derivatives thereof, imidazoles such as 2-methylimidazole, 2-ethyl-4-methylimidazole and derivatives thereof, hydrazides such as dihydrazide adipate or dihydrazide isophthalate and BF3 complex can be mentioned, however, not intending to be limited to these compounds. Further, as a curing agent, which uses an inner molecule hydroxyl group as a crosslinking agent such as polymer epoxy resin and polyhydroxypolyether resin, resol resin and amino resin can be mentioned. And as the resol resin, a condensation product produced by condensing phenols such as phenol or alkyl phenols and aldehydes such as formaldehyde or acetoaldehyde under the presence of a basic catalyst, and alkyletherificated product thereof with alcohols such as methanol, n-butanol and isobuthanol can be mentioned. While, as the amino resin, a condensation product produced by condensing urea, melamine or benzoguanamine and formaldehyde under the presence of a basic catalyst, and alkyletherificated product thereof with alcohols can be mentioned. Furthermore, as the example of a curing agent which self polymerizes epoxy resin by cationic mechanism, Lewis acids or Brφnsted acid can be mentioned, and specifically, San-Aid SI (product of Sanshin Chemical Industries), ADEKA Optomer CP series (product of Asahi Denka industries Co., Ltd.) can be mentioned. Still further, latency curing agent or microcapsuled latency curing agent can be used. And, these curing agent can be used alone or together with.

To the epoxy resin composition of the present invention, a curing accelerator can be used if necessary. For example, various public known curing accelerator, such as phosphines, imidazoles, tertiary amine, BF3 complex, phosphoric acid, para-toluene sulfonic acid can be used, however, not limited to them.

Further, to the epoxy resin composition of the present invention, it is possible to blend other resin or rubber component so as to display the specific feature. As the resin which is possible to be blended, thermosetting resin such as phenol resin, urea resin, melamine resin, furane resin, diallylphethalate resin, silicone resin or urethane resin, or thermosetting resin such as polyester resin, polyamide resin, ABS resin polyolefin resin can be mentioned, and as the rubber component, silicone rubber, carboxyl group containing denatured nitlile rubber, amino group containing denatured nitlile rubber or stylene-butadiene copolymer can be mentioned, however, not limited to them.

Furthermore, to the epoxy resin composition of the present invention, it is possible to blend various fillers so as to display the specific feature. As the filler which is possible to be blended, silica powder, spherical or ground crystalline silica, fused silica, metal carbonate such as calcium carbonate or magnesium carbonate, precipitatable barium sulfate, talc, metal oxide such as aluminum oxide or magnesium oxide, mica, kaoline, clay or antimony trioxide can be mentioned, however, not limited to them.

Still further, the epoxy resin composition of the present invention can use public known coloring pigment, organic or inorganic extender, when need is arisen. As the specific example, titanium oxide, synthesized iron oxide or carbon black can be mentioned. And, a dispersing agent used for a coating, a flow regulating agent, a silane coupling agent, a defoamer, a fluidizing agent, a delustring agent or a thixotropy providing agent can be blended.

Yet further, the epoxy resin composition of the present invention can use organic solvent, reactive diluting agent or a plasticizer can be blended, but not intending to be limited.

The epoxy composition of the present invention has a broad usage as a liquid coating, a casting agent, a complex material, a powder coating, a sealing material and a molding material, and according to these uses, there are various methods for the preparation of the composition.

For example, in the cases of use of a liquid coating, a casting agent and complex material, the epoxy resin composition is prepared under the ordinary temperature or by heating, using a mixing agitator, a disperser, a roller or a planetary and deforming process ca be carried out if necessary. In the cases of a powder coating, sealing material and molding material, the following method is applied. Namely, the epoxy resin is kneaded by a kneader, a roller or a uniaxial or biaxial extruder and pellets are prepared, then regulate the pellets to the desired pellet size using a pulverizing machine or a sieve.

For the preparation of the epoxy resin composition of the present invention as a coating composition, specifically for the uses for a pre-coated steel plate, a can coating and a clear coating, the ordinary method characterized by preparing by a mixing agitator under the ordinary temperature or by heating can be used.

The coating composition obtained as above can be coated on the surface of the pre-coated metal pipe, wooden material, inorganic material or plastic material, by means of a roll coating, a trowel coating, a spray coating, an electrostatic and a fluid dipping coating, as the method for heating, and as the method for heating, heating by gas furnace, electric furnace, far-infrared furnace, electromagnetic induction heating which is heated directly or indirectly, high-frequency heating and or by a burner can be used.

In the case when the epoxy resin composition is used as the molding material or sealing material, the compound which is regulated to the necessary shape (powder, pellet) and size is molded and cured by an injection molding machine or a transfer molding machine and the aimed molded product or sealing product used for IC can be obtained. In the cases when the epoxy resin composition is used as a hybrid material or a laminated plate, prepare a prepreg by impregnating said epoxy resin composition to reinforcing fibers by a hand lay up method or by a continuous roll coating method, then piling obtained prepregs to plural layers and molded and cured by a compression molding machine. Further, as the method for field application, the epoxy resin composition is impregnated to fibers by each layer using hand lay up method, and the cured product can be obtained after prescribed curing time.

BRIEF DESCRIPTION OF THE DRAWING

The vertical axes in FIG. 1A to FIG. 6A indicate the responding amount and horizontal axes indicate the eluting time. And, the vertical axes in FIG. 1B to FIG. 6B indicate the transmittance and horizontal axes indicate the wave length.

EXAMPLES

The present invention will be illustrated more in detail according to the Examples mentioned below, however, not intending to limit the scope of the claims of the present invention. Further, the wording of "parts" appears in following Examples indicates "weight parts".

The epoxy equivalent of resin is measured according to JIS K-7236, and the softening point is measured by JIS K-7234. The quantification of n=0 contents are calculated by areametric analysis from the molecular weight analytical date of gel permeation chromatograph (GPC). The analytical condition is using HLC-8020 (product of TOSO Co., Ltd.), column; GMHXL×2+G2000XL×1 (product of TOSO Co., Ltd.), detector; RI, flow amount 1 ml/min, temperature is 35° C.

Reference Example 1

Figure 1:
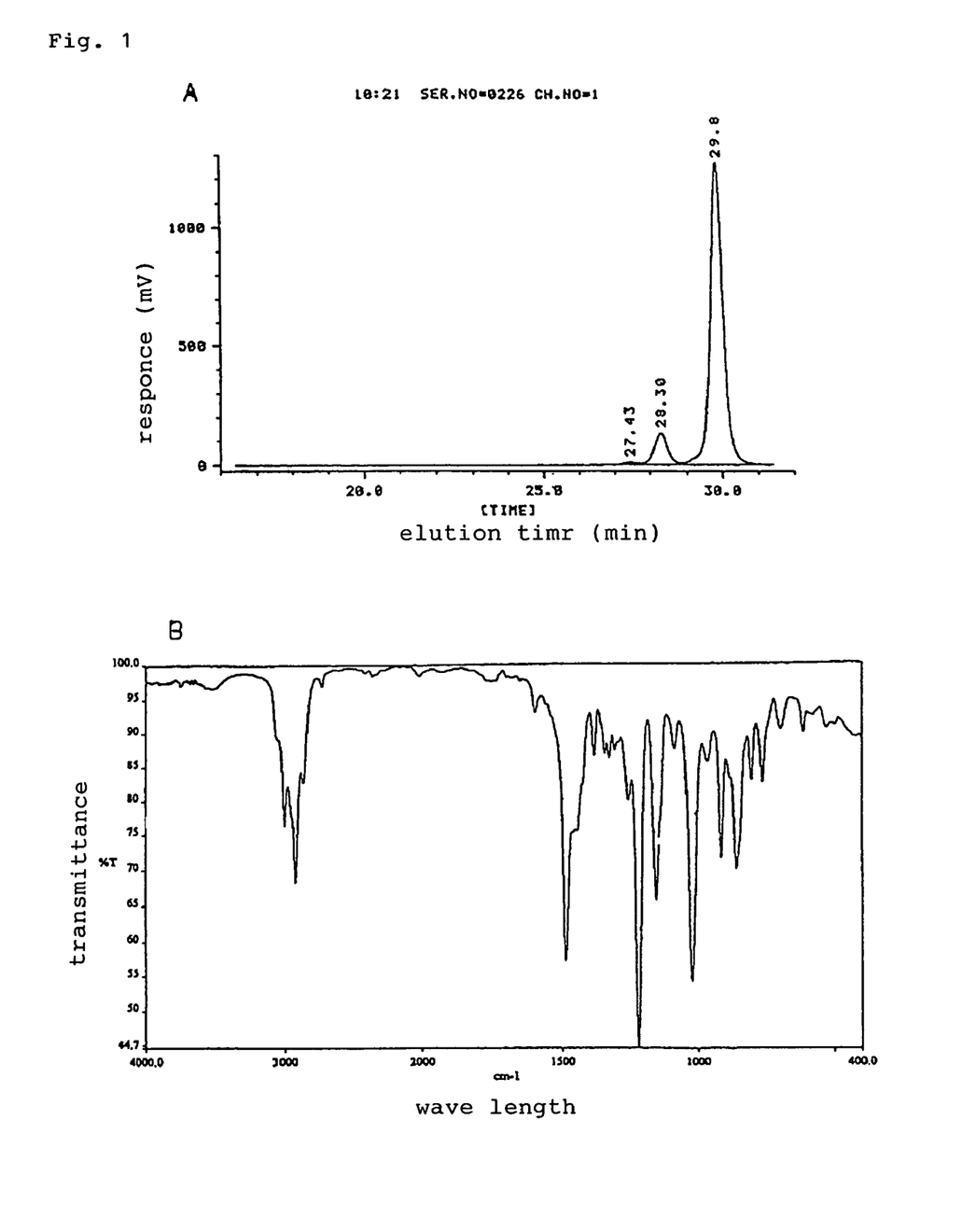
FIG. 1A is the GPC chart of the resin obtained in Reference Example 1 and FIG. 1B is the IR spectrum of the resin obtained in Reference Example 1.

Diglycidylether resin of 3,3',5,5'-tetramethyl-4,4'-dihydroxyldiphenyl methane (YSLY-80XY: product of Shin-Nittetsu Chemicals Co., Ltd.), which is crystalline epoxy resin on the market, was heated to 100° C. and the crystal was fused. To the obtained liquid epoxy resin, 1 g of fine crystal grain of diglycidylether resin of 3,3',5,5'-tetramethyl-4,4'-dihydroxyldiphenyl methane, which was prepared separately, was added. Then stood at 30° C., and the resin was crystallized. The melting point of the obtained crystal was 80° C. and epoxy equivalent was 189 g/eq. The molecular weight distribution of the obtained resin by analytical data of gel permeation chromatograph is shown in FIG. 1A, contents of n=0 component was 90% and infrared absorption spectrum (IR spectrum) was shown in FIG. 1B.

Example 1

189 parts of liquid epoxy resin obtained in Reference Example 1 and 20 parts of 3,3',5,5'-tetramethyl-4,4'-dihydroxyldiphenyl methane were poured into a reacting vessel with a stirrer, a thermometer and a nitrogen gas introducing device and 0.05 parts of n-butyltriphenylphosphoniumbromide was added, and reacted at 160° C. for 5 hours.

Figure 2:
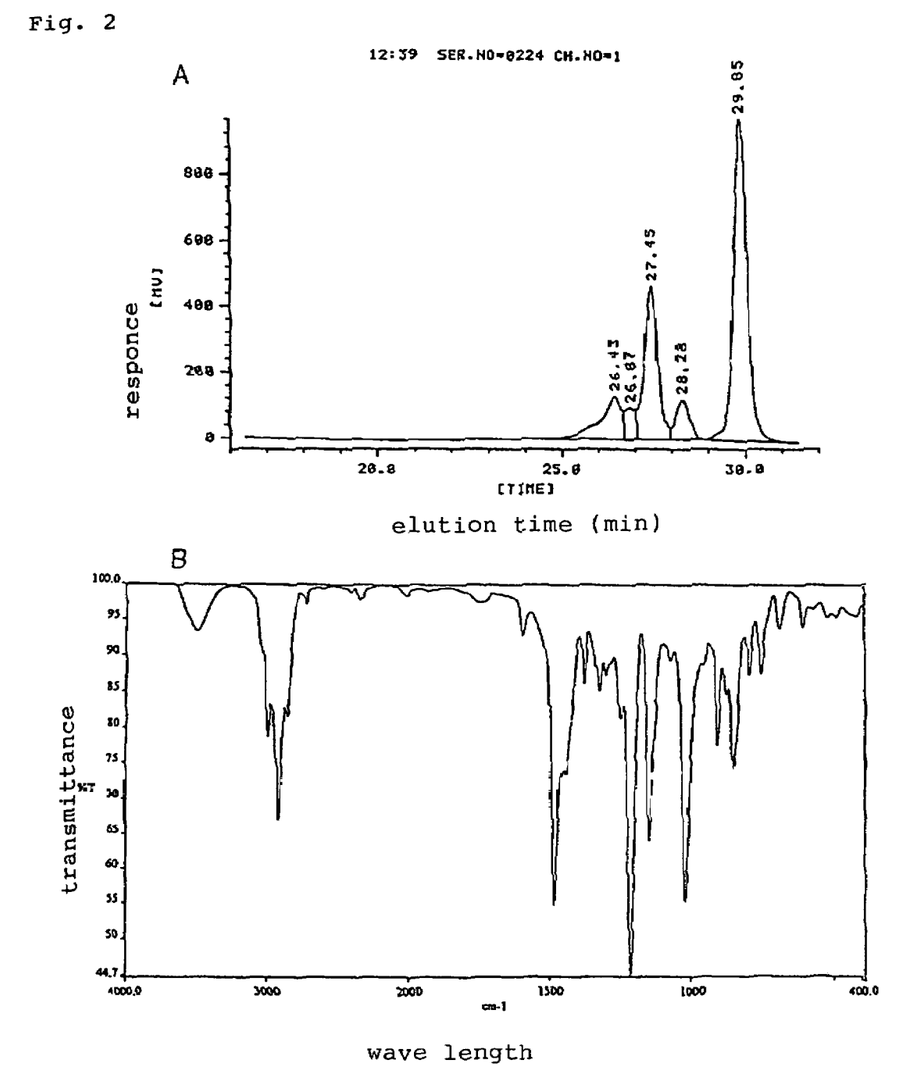
FIG. 2A is the GPC chart of the resin obtained in Example 1 and FIG. 2B is the IR spectrum of the resin obtained in Example 1.

The obtained resin is non crystalline and semi-solid at the normal temperature, and contents of n=0 component was 50% and epoxy equivalent was 250 g/eq. The molecular weight distribution of the obtained resin by analytical data of gel permeation chromatograph is shown in FIG. 2A and infrared absorption spectrum was shown in FIG. 2B.

Example 2

189 parts of liquid epoxy resin obtained in Reference Example 1 and 80 parts of 3,3',5,5'-tetramethyl-4,4'-dihydroxyldiphenyl methane were poured into a reacting vessel with a stirrer, a thermometer and a nitrogen gas introducing device and 0.05 parts of n-butyltriphenylphosphoniumbromide was added, and reacted at 160° C. for 5 hours.

Figure 3:
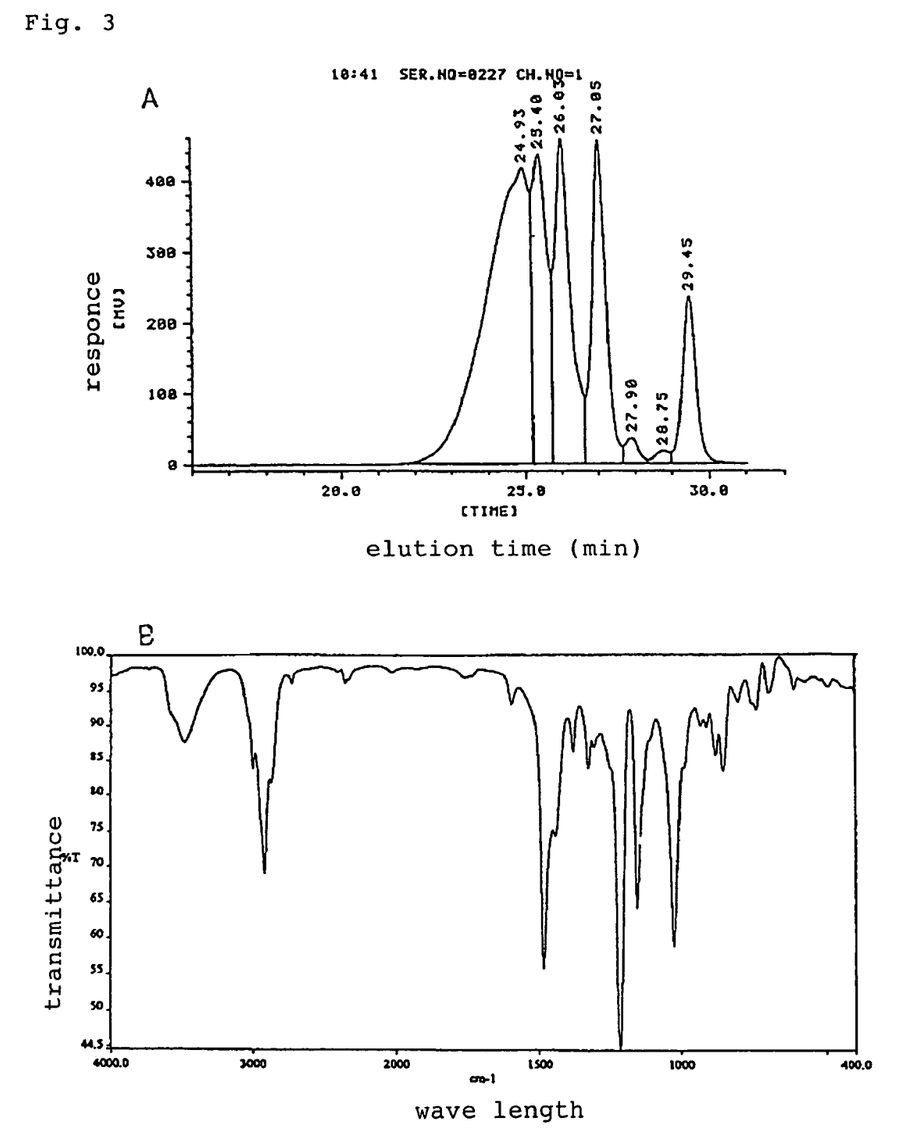
FIG. 3A is the GPC chart of the resin obtained in Example 2 and FIG. 3B is the IR spectrum of the resin obtained in Example 2.

The obtained resin is non crystalline solid resin at the normal temperature, and contents of n=0 component was 7.5%, epoxy equivalent was 800 g/eq and softening point was 95° C. The molecular weight distribution of the obtained resin by analytical data of gel permeation chromatograph is shown in FIG. 3A and infrared absorption spectrum was shown in FIG. 3B.

Example 3

Figure 4:
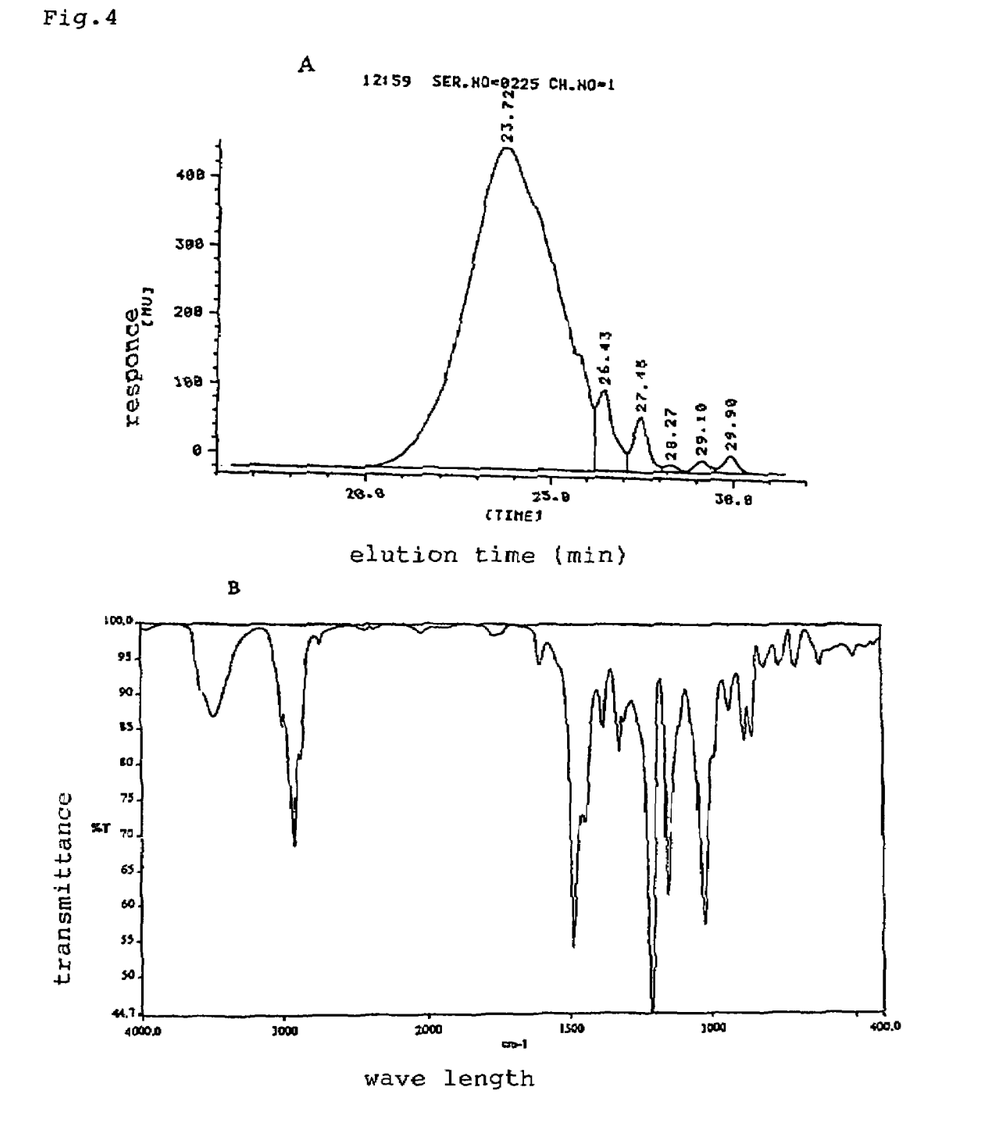
FIG. 4A is the GPC chart of the resin obtained in Example 3 and FIG. 4B is the IR spectrum of the resin obtained in Example 3.

189 parts of liquid epoxy resin obtained in Reference Example 1 and 109 parts of 3,3',5,5'-tetramethyl-4,4'-dihydroxyldiphenyl methane were poured into a reacting vessel with a stirrer, a thermometer and a nitrogen gas introducing device and 0.05 parts of n-butyltriphenylphosphoniumbromide was added, and reacted at 160° C. for 5 hours The obtained resin is non crystalline solid resin at the normal temperature, and contents of n=0 component was 0.8%, epoxy equivalent was 2100 g/eq, softening point was 145° C. and dissolution viscosity was Z4 (n-butylcarbitol, solid 40 wt % solution). The molecular weight distribution of the obtained resin by analytical data of gel permeation chromatograph is shown in FIG. 4A and infrared absorption spectrum was shown in FIG. 4B.

Example 4

Figure 5:
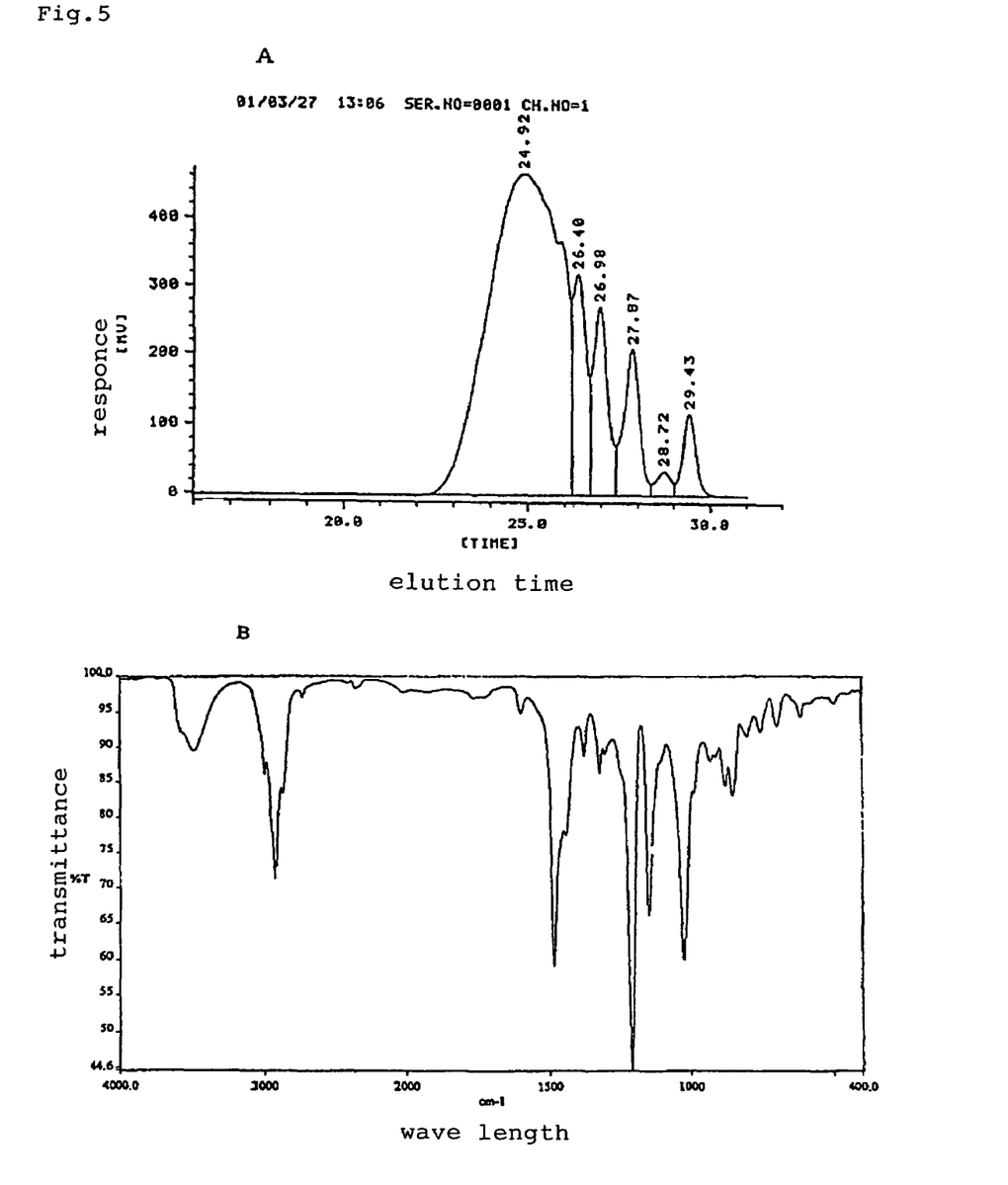
FIG. 5A is the GPC chart of the resin obtained in Example 4 and FIG. 5B is the IR spectrum of the resin obtained in Example 4.

256 parts of 3,3',5,5'-tetramethyl-4,4'-dihydroxyldiphenyl methane, 180 parts of methylisobutylketone and 120 parts of epichlorohydrine were poured into a reacting vessel with a stirrer, a thermometer and a nitrogen gas introducing device and elevated the temperature to 80° C. by stirring under the nitrogen gas flow and dissolved. Then 128 parts of 49% sodium hydroxide was dropped by 1 hour and reacted at 90° C. for 4 hours. After reaction, 320 parts of metylisobutylketone and 350 parts of water were added, and by-product common salt was washed out by water. Further, washing by water was repeated for 3 times using 350 parts of water until the pH of washing water became neutral. The resin solution was distilled under the vacuum condition of 170° C.×10 mmHg so as to remove methylisobuthylketone, and solid epoxy resin was obtained. The softening point of the obtained resin was 100° C., epoxy equivalent was 900 g/eq and contents of n=0 component was 3.4%. The molecular weight distribution of the obtained resin by analytical data of gel permeation chromatograph is shown in FIG. 5A and infrared absorption spectrum was shown in FIG. 5B.

Example 5

Figure 6:
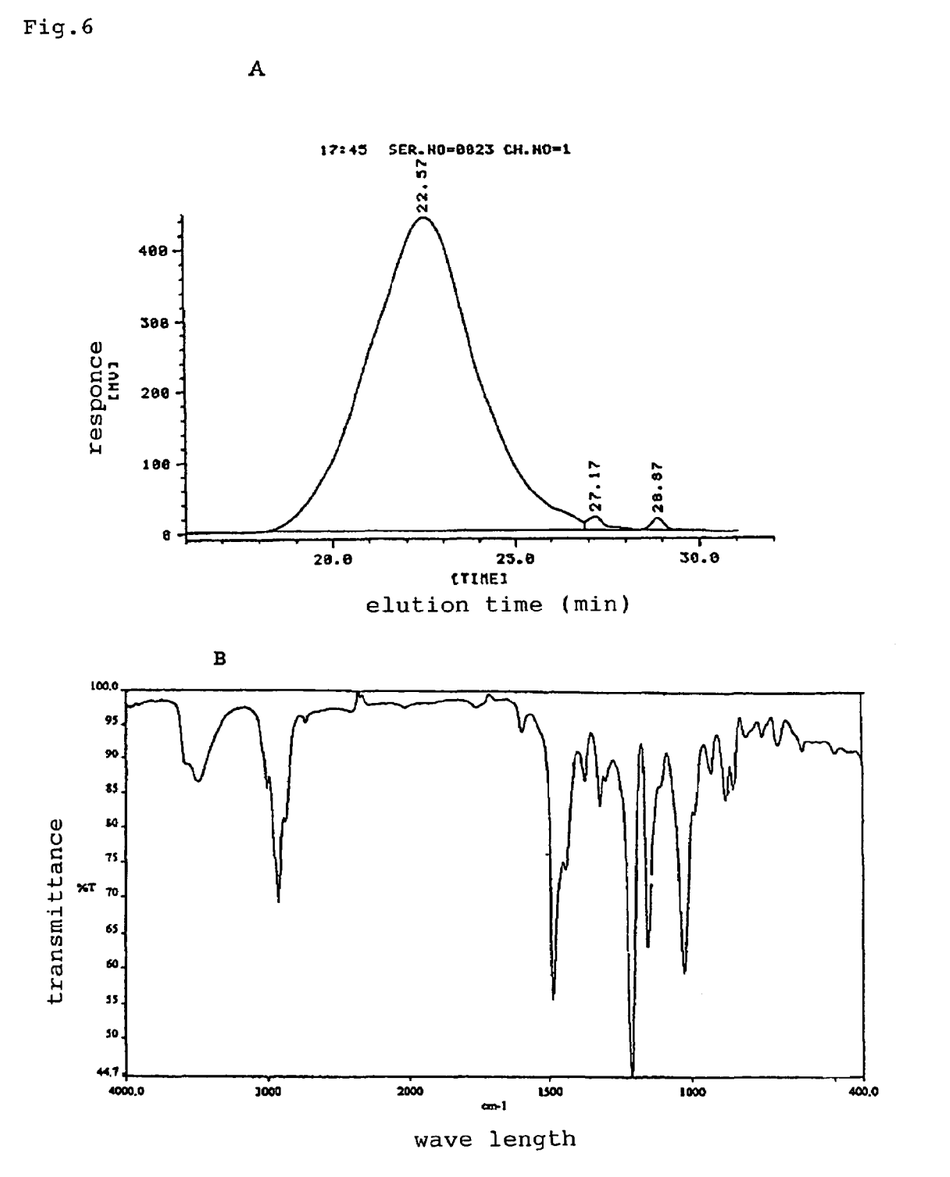
FIG. 6A is the GPC chart of the resin obtained in Example 5 and FIG. 6B is the IR spectrum of the resin obtained in Example 5.

189 parts of 3,3',5,5'-tetramethyl-4,4'-dihydroxyldiphenyl methane, 47 parts of epichlorohydrine, 155 parts of toluene and 155 parts of n-butylalcohol were poured into a reacting vessel with a stirrer, a thermometer and a nitrogen gas introducing device, 44 parts of 48.4% aqueous solution of sodium hydroxide was added as a catalyst, and reacted maintaining the reacting temperature at from 70° C. to 85° C. with constant stirring for 10 hours. After the reaction, 1.5 parts of oxalic acid and 10 parts pure water were added so as to neutralize and separated. Then 200 parts of water was added, washed 2 times and separated. The solvent was removed from the resin solution in a vacuum oven of 5 torr at 200° C. for 1 hour. And non-crystalline polyhydroxypolyether resin whose weight average molecular weight is 67000, epoxy equivalent is 35000 g/eq was obtained. The molecular weight distribution of the obtained resin by analytical data of gel permeation chromatograph is shown in FIG. 6A and infrared absorption spectrum was shown in FIG. 6B.

The specimens of coating were prepared using epoxy resins obtained in Reference Example 1 and Examples 1 to 5 as the epoxy resin component, and evaluation of a coating was carried out. Regarding the semi-solid resin of Example 1, the dissolution stability to solvent as a solvent varnish which is used as the anticorrosive coating was evaluated. Regarding the solid resins of middle molecular weight obtained in Examples 2 and 4, the performance when used as the powder coating was evaluated. And, regarding the solid resin of high molecular weight and polyhydroxypolyether resin obtained in Examples 3 and 5, the clear coated film of baking coating was evaluated.

<Stability of Resin Varnish: Application to the Anticorrosive Coating>

Example 6, Comparative Example 1

Resins obtained in Reference Example 1 and Example 1 were respectively dissolved in toluene solvent and vanishes of resin content 90% by weight were prepared. These vanishes were preserved in the room of 5° C. for one day, and the crystallinity of these varnishes were inspected.

Comparative Example 1

Vanish using the Resin of Reference Example 1

Crystals were deposited and solidified.

Example 6

Vanish using the Resin of Example 1

Has transparent appearance, and the deposit of crystals was not inspected.

<Application to the Powder Coating>

Epoxy resins obtained in Examples 2 and 4 and bisphenol A epoxy resin (Epotohto YD-014, product of Tohto Kasei Co., Ltd.: epoxy equivalent is 945 g/eq) were previously mixed according to the recipe of Table 1 based on the conventional method for preparation of powder coating by a super mixer, then palletized by fuse extrusion using a mono-axial extruder. The obtained pellets were pulverized by means of a ACM pulverizer, then the obtained fine particles were classified using a sieve and the powder coating having average particle size from 40 μm to 60 μm was obtained. These powder coatings were coated on the surface of 200° C. pre-heated cold rolled steel plate prescribed by JIS G 5528 (specimen A: thickness 2.0 mm×width 70 mm×length 90 mm, specimen B: thickness 1.2 mm×width 90 mm×length 90 mm) by spray coating method. Then cured by 200° C. curing temperature for 20 minutes and a coated film for test having thickness of 200 μm. The performance was evaluated in comparison.

Example 7

100 parts of epoxy resin obtained in Example 2, 3 parts of dicyandiamide as a curing agent, 0.5 parts of CUREZOL C11Z (product of Shikoku Kasei Co., Ltd.) as a curing accelerator, 30 parts of silica as an inorganic filler, 5 parts of titanium dioxide as a coloring pigment and 1 part of Acronal 4F as a flow regulating additive were weighted and premixed by a super mixer for 3 minutes. Further, kneaded by a mono-axial extruder and cooled, then roughly pulverized to the size smaller than 1 cm. After that, pulverized by ACM pulverizer ACM-5 (product of Hosokawa Micron Co., Ltd.), rough particles were removed using a sieve of 150 mesh, thus the powder coating of 48 μm particle size was obtained.

Example 8

By the same process to Example 7 except changing dicyandiamide, which is the curing agent of Example 2, and CUREZOL C11Z to 3 parts of CUREZOL 2PZ (product of Shikoku Kasei Co., Ltd.) the powder coating of 48 μm particle size was prepared.

Example 9

By the same process to Example 8 except changing the epoxy resin obtained in Example 4 to 100 parts, the powder coating of 45 μm particle size was prepared.

Comparative Example 2

By the same process to Example 7 except changing the epoxy resin of Example 7 to bisphenol A epoxy resin (Epotohto YD-014, product of Tohto Kasei Co., Ltd.: epoxy equivalent is 945 g/eq, softening point is 94° C.), the powder coating of 45 μm particle size was prepared.

Comparative Example 3

By the same process to Example 8 except changing the epoxy resin of Example 7 to the crystalline epoxy resin of Reference Example 1, the powder coating of 45 μm particle size was prepared.

The evaluation of performance of the coated films were measure based on the following inspection items and the methods (1) Appearance of Coated Film (JIS G 5528 6.2)

Using specimen A, the smoothness of the film is inspected by the inspector's eyes and whether pinhole exists or not is measured by Holiday-detector applying electric voltage of 1000V.

| good | ○ |
|---|---|
| not good | X |

(2) Flexibility of Coated Film (JIS G 5528 5.4.4)

Evaluated by Erichsen test (JIS Z 2247) using specimen B.

| bigger than 3 mm | ○ |
|---|---|
| not bigger than 3 mm | X |

(3) Shock Resistance of Coated Film (JIS G 5528 5.4.3)

Using specimen A, evaluated by Dupont shock testing machine (JIS K 5400 8.3.2). A shot pattern of ¼ inch radius is used, measured by dropping a weight of 500 g from 50 cm height.

| good | ○ |
|---|---|
| not good | X |

(4) Boiling Water Resistance of Coated Film (JIS G 5400 8.20)

Specimen A is dipped into boiling water and the generation of swollen is observed. Lapse of days until the observation of swollen is measured.

| not observed for 1 month | ○ |
|---|---|
| not observed for 1 week | Δ |
| observed within 1 week | X |

<Application to the Baking Coating>

Examples 10-11, Comparative Examples 4-5

To 400 parts of resin obtained in Examples 3 and 5, bisphenol A epoxy resin (EPOTHOTO YD-909, product of Thoto Kasei Co., Ltd.; epoxy equivalent is 2080 g/eq and softening point is 135° C.) and phenoxy resin of bisphenol A skeletal structure (YP-50, product of Thoto Kasei Co., Ltd.; weight—average molecular weight is 72000), 600 parts of toluene and 600 parts of cyclohexanone are dissolved respectively, and solutions of resin concentration 25 weight % were prepared. 100 parts of Hitanol 4010 (resol phenol resin: product of Hitachi Kasei Industries Co., Ltd.) and 2 parts of 85% phosphoric acid were added and stirred, thus the uniform coating was obtained. The obtained coatings were coated on the surface of aluminum plate of 0.3 mm thickness using a bar coater, baked at 200° C. for 10 minutes and coated films of Examples 10, 11 and Comparative Examples 10, 11 of 10 μm thickness were obtained. The glass transition point and the bending process ability of the obtained coated films were measured and compared. The results are shown in Table 2.

TABLE 2

| | | Example 10 | Example 11 | Co. Exp. 4 | Co. Exp. 5 |
|---|---|---|---|---|---|
| resin | epoxy equivalent (g/eq) | 2100 | 3500 | 2080 | 62000 |
| | dissolution viscosity (G-H 25° C.) | Z4 *1) | Z4 *2) | Z4 *1) | Z4 *2) |
| component of resin | resin of Example 3 | 400 | | | |
| | resin of Example 5 | | 400 | | |
| | YD-909 | | | 400 | |
| | YP-50 | | | | 400 |
| component of curing agent | Hitanol 4010 | 100 | 100 | 100 | 100 |
| | 85% phosphoric acid | 2 | 2 | 2 | 2 |
| | mixed solvent | 1200 | 1200 | 1200 | 1200 |
| physical | adhesion | 100/100 | 100/100 | 100/ | 100/ |

TABLE 1

| | | Example 7 | Example 8 | Example 9 | Co. Exp. 2 | Co. Exp. 3 |
|---|---|---|---|---|---|---|
| resin | resin of Example 2 | 100 | 100 | | | |
| | resin of Example 4 | | | 100 | | |
| | resin of Reference Example 1 | | | | | 100 |
| | YD-014 | | | | 100 | |
| curing agent | dicyandiamide | 3 | | | 3 | |
| | CUREZOL 2PZ | | 3 | 3 | | 3 |
| accelerator | CUREZOL C11Z | 0.5 | | | 0.5 | |
| filler | titanium dioxide | 5 | 5 | 5 | 5 | 5 |
| | silica | 30 | 30 | 30 | 30 | 30 |
| | Acronal 4F | 1 | 1 | 1 | 1 | 1 |
| evaluation of coated film | appearance | ○ | ○ | ○ | ○ | ○ |
| | flexibility | ○ | ○ | ○ | ○ | X |
| | shock resistance | ○ | ○ | ○ | ○ | ○ |
| | boiling water resistance | ○ | ○ | ○ | Δ | ○ |
| generation of crystallinity of epoxy resin material | | no | no | no | no | yes |

Co. Exp.: Comparative Example

TABLE 2-continued

|  |  | Example 10 | Example 11 | Co. Exp. 4 | Co. Exp. 5 |
|---|---|---|---|---|---|
| property of coated film | bending process ability | ○ | ○ | 100 ○ | 100 ○ |
|  | glass transition point | 87 | 95 | 82 | 90 |
|  | retort whitening | ○ | ○ | Δ | X |
| generation of crystallinity of epoxy resin material |  | no | no | no | no |

Co. Exp.: Comparative Example
*1) 40 wt % solution of n-butylcarbitol resin
*2) 40 wt % solution of methiethylketone resin The testing items and the methods of the coated films were measure based on the following methods and evaluated.

(1) Adhesion 100 checker marks of 1 mm×1 mm having thickness to reach the substrate are engraved on the surface of coated film using a knife. Cellophane tape is adhered on the surface of said coated film and peeled imidiately. The number of checker marks remained on the substrate is counted by eyes of the inspector.

(2) Bending Process Ability

The coated plate is bent so as the coated surface to be outside, and pressed by 20 kg/cm² pressure at 20° C. Then electric voltage of 5V is applied to the bent part by an enamel rater (exciting testing machine) and electric current is measured. Damaged state of the coated film is evaluated according to following 3 steps.

| electric current value is less than 1 mA | ○ |
|---|---|
| electric current value is higher than 1, less than 5 mA | Δ |
| electric current value is higher than 5 mA | X |

(3) Glass Transition Point

Coating is coated on the surface of glass plate by a bar coater so as the thickness of dried film to be 10 μm and baked at the temperature of 200° C. for 10 minutes. The coated film is removed by a knife and the glass transition point is measured by means of DSC under 10° C./min temperature elevating rate.

(4) Retort Resistance

Specimen of the coated plate is retort treated at 125° C. for 30 minutes, and the whitening degree of the coated film is inspected by inspector's eyes and evaluated according to following 3 steps.

| not whitened | ○ |
|---|---|
| partially whitened | Δ |
| whole surface is whitened | X |

<Application Example of the Coated Product>

To the inner surface of a cast iron tube of 100 mm diameter and 500 mm length, which is previously heated to 250° C., powder coating of Example 8 which uses the resin material of Example 2 is applied by electrostatic coating method rotating the tube by 320 rpm, then cooled down and cured.

The metal tube, to the inner surface of which smooth and homogeneous coating film of 250 μm is formed, is obtained. This tube is cut to the length direction and the coated film surface is inspected by a pinhole tester, and it is understood that the coated film without pinhole is formed. Further, it is confirmed that the same performance to Example 8 is obtained.

Effect of the Invention

By controlling the molecular weight of epoxy resin with symmetric skeletal structure, it becomes possible to provide the epoxy resin which is excellent at solvent dissolution stability in the state of viscous liquid, semi solid or solid not generating crystallinity at from the normal temperature to the middle temperature. Accordingly, it becomes possible to provide the epoxy resin suited to coating, molding material, hybrid material, adhesive, insulation material for electric or electronic parts or laminated board which gives a curing product being excellent in heat resistance, adherent, water resistance, mechanical performance and electric performance. The epoxy resin composition which uses epoxy resin of the present invention is useful for the broad uses such as normal temperature curing coating, powder coating, adhesive, hybrid material, laminated board, molding material or sealing material for semi conductor.

What is claimed is:

1. A non-crystalline epoxy resin represented by general formula (2), (2)

wherein $R_1$-$R_4$ indicate a hydrocarbon group of carbon number 1-6, n is 0 or an integer of 1 or more and X is a bond or the following general formula wherein $R_5$-$R_6$ indicate a hydrogen atom or hydrocarbon group of carbon number 1-6, obtained by reacting liquid epoxy resin and an aromatic compound represented by general formula (1), (1)

wherein $R_1$-$R_4$ and X are as identified herein, having molecular weight distribution comprising, content of n=0 component in the epoxy resin represented by general formula (2) is 60% or less and epoxy equivalent is 250 g/eq or over.

2. The epoxy resin of claim 1, wherein aromatic compound represented by general formula (1) according to claim 1, is 3,3',5,5'-tetramethyl-4,4'-dihydroxyldiphenyl methane.

3. A coated product prepared by coating the epoxy resin composition of claim 1 on the surface of an object and curing the coating.

4. A coated product prepared by coating the epoxy resin composition of claim 2 on the surface of an object and curing the coating.

* * * * *